Nov. 7, 1967    R. L. GRAMS ETAL    3,351,321
TRAILER TONGUE LIFTING DEVICE
Filed July 21, 1966
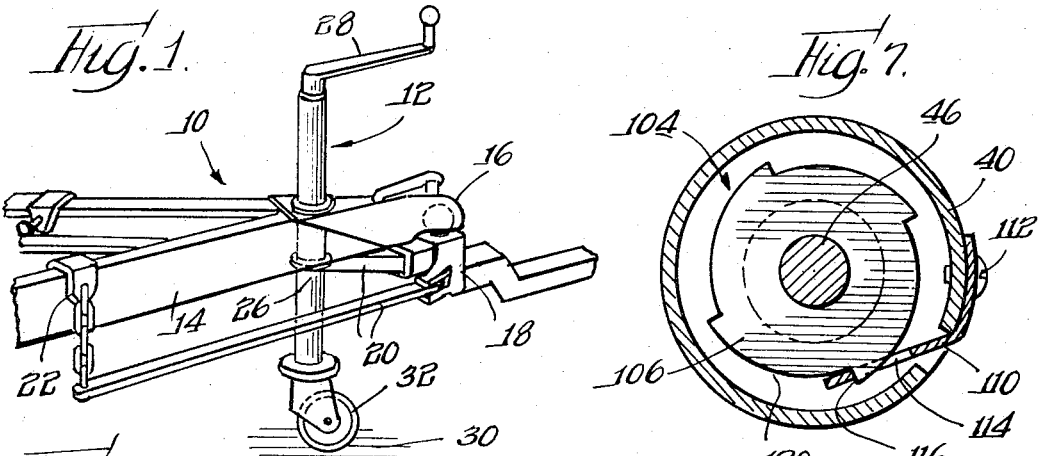
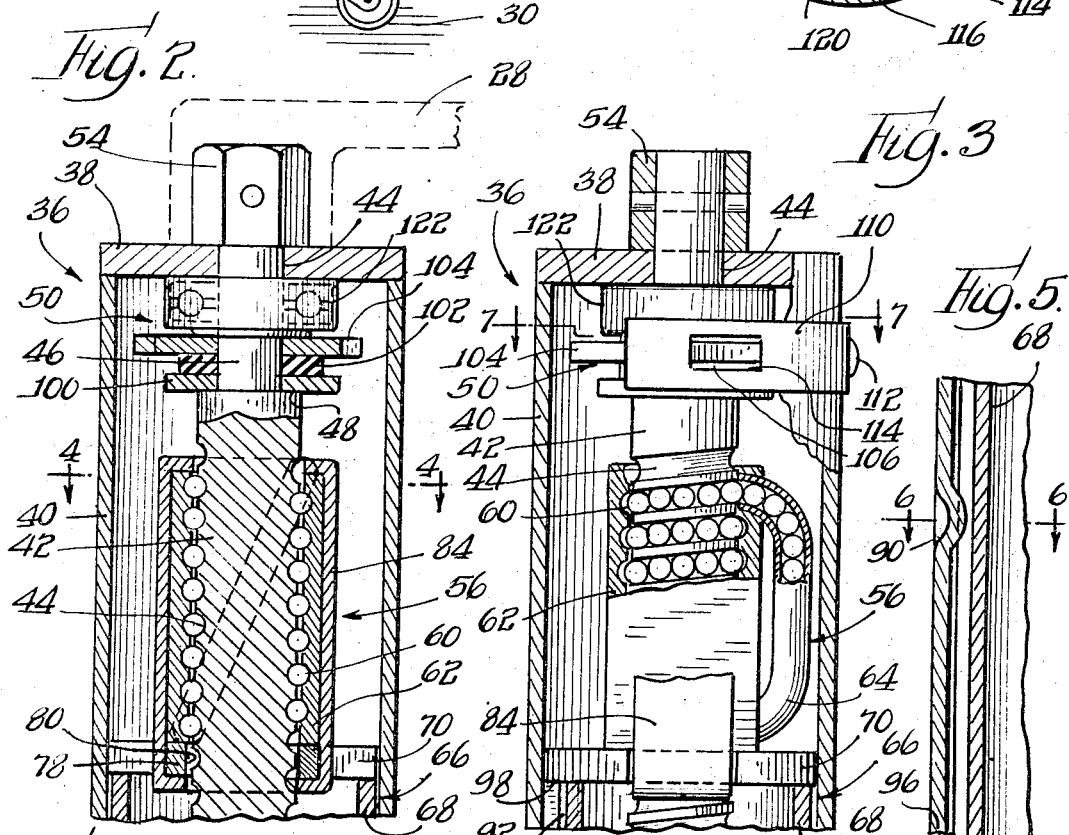
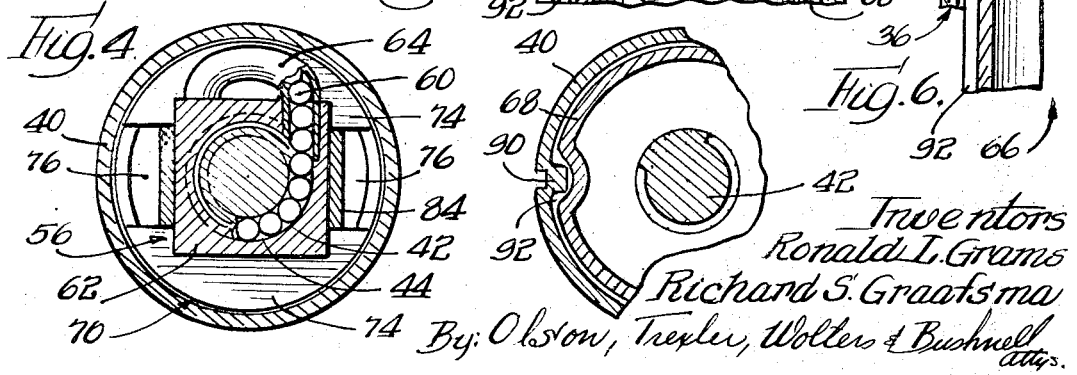
Inventors
Ronald L. Grams
Richard S. Graafsma
By: Olson, Trexler, Wolters & Bushnell
attys.

United States Patent Office 3,351,321
Patented Nov. 7, 1967

3,351,321
TRAILER TONGUE LIFTING DEVICE
Ronald L. Grams, St. Joseph, and Richard Samuel Graafsma, Benton Harbor, Mich., assignors to Auto Specialties Manufacturing Company, St. Joseph, Mich., a corporation of Michigan
Filed July 21, 1966, Ser. No. 566,825
4 Claims. (Cl. 254—86)

ABSTRACT OF THE DISCLOSURE

There is disclosed a lifting device or jack mountable on a trailer tongue and having outer and inner telescoping tubular housings. A screw and ball nut are provided for relatively extending and retracting the housings. A ratchet disk and friction element are frictionally coupled with the screw and cooperate with a flexure spring pawl element fixed to the housing for resisting rotation of the screw when the assembly is placed under load.

---

This invention relates generally to a lifting device and more particularly to a trailer tongue lifting device.

A trailer is commonly connected to a tow vehicle by means of a ball and socket hitch wherein the ball is located on the tow vehicle and the mating socket is located on a tongue of the trailer. It is also a common practice to utilize compensating springs extending between the tow vehicle and the trailer to keep the tow vehicle level when the trailer is connected. The first step in connecting the tow vehicle to the trailer is the aligning of the two vehicles so that the ball and socket are adjacent to each other. Then, the trailer tongue must be raised so that the socket can be locked onto the ball of the tow vehicle hitch. Finally, after the ball and socket have been locked in place, the trailer tongue and rear end of the tow vehicle must be raised together so that compensating springs extending from the hitch of the tow vehicle to the trailer tongue can be connected.

The above operation requires considerable effort on the part of an operator. In fact, the operation usually entails the use of a jack, particularly for the raising of the rear of the tow vehicle and trailer tongue to connect the compensating springs. The prior art jack assemblies have been found to be unsatisfactory for this operation, in that they are difficult to use and require a large number of turns to raise a vehicle. The prior art jack assemblies are also unsatisfactory in that they are relatively expensive and difficult to fabricate.

Therefore, an object of this invention is to provide a trailer tongue lifting device which is inexpensive to manufacture and requires a minimum amount of effort to operate.

Other objects and features of the invention will become more apparent upon a reading of the following detailed description, taken in connection with the accompanying drawings, wherein:

FIG. 1 is a perspective view of a trailer tongue on which a preferred embodiment of our invention is mounted;

FIG. 2 is an enlarged sectional view illustrating the interior construction of a lifting device utilized with the trailer tongue assembly of FIG. 1;

FIG. 3 is an enlarged sectional view displaced 90° from the view of FIG. 2, further illustrating the relationship of the interior components of the lifting device;

FIG. 4 is an enlarged sectional view, along the line 4—4 of FIG. 2, illustrating the structure of a recirculating ball type nut unit;

FIG. 5 is a sectional view illustrating a detent means for limiting the motion of an inner housing of the lifting device relative to an outer housing for the lifting device;

FIG. 6 is an enlarged sectional view, taken along the line 6—6 of FIG. 5, illustrating the relationship between the detent of FIG. 5 and an inner and outer housing of the lifting device; and FIG. 7 is an enlarged sectional view, along the line 7—7 of FIG. 3, showing the positioning of a ratchet member relative to an outer housing of the lifting device utilized in the trailer tongue assembly of FIG. 1.

Referring now to the drawings in greater detail, there is shown in FIG. 1 a perspective view of a trailer tongue assembly 10 which includes a lifting device 12 mounted on a tongue 14 of a trailer. A socket member 16 is also mounted on the tongue 14 and engages a ball assembly 18 in a well-known manner, to connect the trailer to a tow vehicle. A pair of rearwardly extending compensating springs 20 are also connected to the hitch 18. The compensating springs 20 are secured by brackets 22 to the tongue of the trailer. The compensating springs act as a resilient extension of the tow vehicle and serve to maintain the tow vehicle on an even keel when a heavy trailer is connected to the tow vehicle by the ball and socket hitch 16 and 18.

The lifting device 12 is secured to the tongue by means of an annular mounting or load engaging plate 26 which is secured to an outer housing of the lifting device 12. A handle member 28 is mounted on an upper end of the lifting device 12. Rotation of the handle member 28 actuates the lifting device to move the trailer tongue 14 vertically relative to a support surface 30 and caster assembly 32 which is mounted on an inner housing of the lifting device 12. By rotating the handle member 28 counterclockwise the trailer tongue is raised relative to the support surface 30 and ball 18 of the tow vehicle hitch. Similarly, by rotating the handle 28 clockwise the tongue is lowered relative to the support surface 30 and ball hitch 18.

The construction of the lifting device 12 is shown in greater detail in FIGS. 2 and 3. The lifting device 12 includes a cylindrical outer housing 36 having a circular endwall 38 and a tubular downwardly extending sidewall 40. Mounted within the housing 36 is a screw 42 having threads 44 which extend for substantially the entire length of the screw. The screw is necked down at an upper end portion 46 to form a shoulder 48 on which a friction means 50 is mounted. The friction means 50 is positioned between the shoulder 48 and the endwall 38 of the outer housing. The uppermost end of the necked down end portion 46 of the screw is enclosed by a lug nut 54 which is engaged by a socket in the handle 28 to rotate the screw 42 relative to the outer housing 36.

A recirculating ball type nut unit 56 is mounted on the screw 42. The recirculating ball type nut unit 56 includes a plurality of balls 60 which are positioned in rotating sliding engagement with the threads 44 of the screw 42. The balls 60 are held in position on the threads by an outer nut body 62 which extends longitudinally of the screw 42. A recirculating tube 64, see FIG. 3, is provided to enable the balls to be recirculated as the nut body 62 is moved vertically relative to the screw 42, when the screw is turned by the handle 28. The operation of recirculating ball type nut units is well known to those skilled in the art and need not be described in further detail at this time.

An inner housing 66 is mounted in telescopic relationship with the outer housing 40 of the lifting device 12. From an inspection of FIGS. 2 and 3, it will be apparent that the inner housing 66, the outer housing 40, the screw 42 and the recirculating ball type nut 56 are all mounted coaxially relative to each other. The inner housing 66 includes a tubular downwardly extending sidewall 68 and a generally circular endwall 70.

As is perhaps best seen in FIG. 4, the endwall 70 is provided with a pair of spaced apart arcuate sections 74 which are separated by inwardly extending slots or recesses 76. The sections 74 are interconnected by a mounting section 78 (see FIG. 2) which has a circular aperture 80 through which the screw member 42 extends.

The mounting section 78 of the endwall 70 is engaged by a retaining shell 84 which surrounds the recirculating ball type nut unit 56 on four sides, i.e. the two longitudinally extending sidewalls and the endwalls. The retaining shell 84 fixedly interconnects the nut 62, the endwall 70, and inner wall 68 so that they all move as a unit relative to the screw 42. Therefore, when the recirculating ball type nut is displaced vertically, relative to the screw 42 by turning the handle 28, the inner housing 66 is displaced vertically relative to the outer housing 36 on which the screw 42 is mounted.

As shown in FIGS. 5 and 6, the inner housing 66 is prevented from rotating relative to the outer housing 36 by an inwardly protruding detent 90 which is integrally formed in the downwardly extending tubular sidewall 40 of the outer housing 36. The detent 90 engages a longitudinally extending groove 92 to prevent the sidewall 40 of the outer housing 36 from rotating relative to the sidewall 68 of the inner housing 66. Since the recirculating ball type nut unit 56 is rigidly connected to the inner housing 66, the recirculating ball type nut unit does not rotate relative to the outer housing 36 when the screw 42 is rotated relative to the outer housing.

The detent 90, as is seen in FIG. 5, is positioned a substantial distance upwardly from the lowermost end 96 of the sidewall 40. When the handle 28 is rotated to extend the inner housing 66 outwardly relative to the outer housing 36, the detent 90 is moved upwardly, relative to the inner housing 66, until the detent engages an outwardly protruding edge 98 of the endwall 70 (see FIG. 3). Therefore, the inner housing can be extended for only a predetermined distance relative to the outer housing. This prevents the inner housing from being extended to such a distance that the lifting device 12 would buckle, due to the fore and aft or side loads which are usually encountered on a trailer tongue.

Referring now to FIGS. 2 and 7, the friction means 50 includes a first metallic base disk or plate 100 which is connected in abutting engagement with the shoulder 48 of the screw 42. The base disk 100 is secured against rotation relative to the cylindrical shoulder 48 of the screw 42 by frictional force. A friction disk or plate 102 is mounted in juxtaposition with the base disk 100. The friction disk 102 is made of rubber, or some other suitable substance having a relatively high coefficient of friction when placed in mating engagement with the base disk 100. However, the coefficient of friction between the shoulder 48 of the screw 42 and the base disk 100 is higher than the coefficient of friction between the base disk 100 and the friction disk 102 to retain the base disk against rotation relative to the screw 42. Juxtaposed on top of the friction disk 102 is a metallic ratchet disk or plate 104. The ratchet disk or plate 104, as is best seen in FIG. 7, includes a plurality of outwardly extending wedge shaped teeth 106.

Referring now to FIG. 7, taken in conjunction with FIG. 3, it will be seen that the ratchet disk 104 is engaged by an inwardly extending pawl or lock spring 110 which is mounted on the sidewall 40 of the outer housing 36 by a suitable connection means 112. The lock spring or pawl 110 has a longitudinally extending aperture 114 which engages a forward radially outwardly extending surface 116 of the ratchet teeth 106 when the ratchet is turned in the clockwise direction. However, it should be noted that when the ratchet disk 104 is turned in a counter-clockwise direction the arcuate surface 120 of the teeth 106 will cam the pawl 110 outwardly to enable the ratchet disk to be turned relative to the outer housing 36.

The friction means 50 also includes a thrust bearing 122 mounted in juxtaposition with an upper surface of the ratchet disk 104 and a lower surface of the endwall 38. The thrust bearing 122 is of a well known structure and permits the friction means 50 and screw 42 to be turned freely relative to the housing 36. However, as previously pointed out, the pawl 110 engages the ratchet disk 104 to prevent the disk from being rotated in a clockwise direction relative to the housing 36.

From a consideration of FIGS. 1 and 2, it will be apparent that the trailer tongue 14 presses downwardly on the mounting plate or collar 26 to press the endwall 38 against the friction means 50. This downward force is opposed by an upward force exerted by the wheel assembly 32 on the inner housing 66, the recirculating ball type nut unit 56, and the screw 42. The shoulder 48 of the screw 42 presses the friction means 50 upwardly against the lower surface of the end wall 38. Therefore, the friction means 50 is compressed between the endwall 38 of the outer housing and the shoulder 48 of the screw 42. When the friction means is compressed, the disk 102 frictionally engages the upper surface of the base disk 100 which is retained by frictional engagement with the shoulder 48 against rotation relative to the screw 42 and the lower surface of the ratchet disk 104. Therefore, the friction disk 102 retards relative movement between the ratchet disk 104 and the screw 42.

When the handle 28 is rotated counterclockwise, the ratchet disk 104 is freely rotated relative to the outer housing 36 and the locking pawl 110. As the handle 28 is turned counterclockwise, the recirculating nut unit 56 is moved longitudinally downwardly relative to the screw 42 to decrease the telescoping relationship between the inner housing 36 and the outer housing 66 to raise the trailer tongue 14. The thrust bearing 122 facilitates the rotation of the screw 42. When the trailer tongue 14 has been raised the desired distance, the rotation of the handle 28 is stopped. The loading of the trailer tongue 14 of the lifting device 12 tends to force the recirculating ball type unit 56 upwardly relative to the screw 42. This tendency toward upward movement results in the screw 42 being turned clockwise. The clockwise movement of the screw is stopped by the engagement of the radially extending forward edge 116 of a ratchet tooth 106 with the pawl 110. The friction forces between the ratchet disk 104, friction disk 102 and base disk 100 prevents the screw 42 from rotating relative to the outer housing when the ratchet tooth is engaged by the pawl 110.

The trailer tongue is lowered by rotating the handle 28 in a clockwise direction. Clockwise rotation of the handle 28 turns the screw 42 clockwise and causes the recirculating ball type nut unit 56 to move longitudinally upwardly of the screw to increase the telescopic relationship between the inner and outer housings of the lifting device 12. When the handle 28 is turned clockwise, the forward edge 116 of the ratchet tooth 106 engages the locking pawl 110 to prevent the ratchet disk from turning relative to the outer housing 36. Since the screw is turned relative to the outer housing 36 while the ratchet disk 104 is held in a stationary position relative to the outer housing, the frictional forces exerted between the friction disk 102, the base disk 100, and ratchet disk 104 must be overcome to provide a sliding movement of either or both the ratchet disk 104 and the base disk 100 relative to the friction disk 102. Since the normal loading of the trailer tongue on the lifting device 12 tends to cause the screw 42 to rotate in a clockwise direction, the rotating of the handle 28 to overcome the frictional forces between the friction disk 102, ratchet disk 104 and base disk 100 is comparatively easy.

For purposes of affording a more complete understanding of the invention, it is advantageous now to provide a functional description of the mode in which the component parts thus far identified operate. The trailer tongue 14 is lifted when the trailer is to be connected to a ball hitch 18, by turning the handle 28 counterclockwise. Counterclockwise rotation of the handle 28 will cause the recirculating ball type nut unit 56 to move longitudinally downwardly on the screw 42 to raise the outer housing 36 and tongue 14. When the tongue 14 has been raised so that the socket hitch 16 is above the ball 18, the trailer can be moved so that the socket 16 will be directly above the ball 18. The handle 28 will then be rotated clockwise to lower the tongue 14 so that the socket 16 will engage the ball 18. Once the ball and socket have been locked together, the rear end of the tow vehicle will be forced downwardly so that the vehicle slopes generally upwardly in a forward direction. In order to bring the vehicle back on an even keel, the handle 28 is again rotated counterclockwise to raise the trailer tongue, and ball hitch 16 and 18. When the trailer tongue has been raised for a sufficient distance so that the tow vehicle is on a substantially level plane, the brackets 22 for the compensating springs 20 are connected to the tongue 14 of the trailer. The handle 28 is then rotated clockwise to raise the wheel assembly 32 away from the support surface 30.

The lifting device 12 is maintained in a load bearing position by a friction means 50. The force exerted by the friction means 50, when combined with the friction between the ball 60, ball nut 62, and threads 44 of the screw 42, will prevent the recirculating ball type nut unit from being displaced longitudinally upwardly by the loading of the lifting device 12. The raising of the trailer tongue is facilitated by the fact that the friction means does not, due to unidirectional latching of the ratchet wheel 104 by the pawl 110, resist the counterclockwise rotation of the screw 42 to raise the tongue 14. However, when the tongue is to be lowered, the ratchet disk 104 is maintained in a stationary position by the pawl 110 and the friction means 50 tends to retard the lowering of the tongue. Since the load force on the lifting device 12 tends to force the inner housing into a telescopic relation with the outer housing, the clockwise rotation of the screw 42 is assisted by the natural loading of the lifting device 12.

The resistance of the friction means 50 to clockwise rotation of the screw 42 will, to a large extent, depend upon the coefficient of friction of the friction disk 102 and the surface area of the disk. By varying the materials of which the disk 102 is made and the surface area of the disk, it will be apparent to those skilled in the art that the frictional restraining force against clockwise rotation of the screw 42 can be adjusted to suit any desired condition. For example, if the friction disk 102 were made of polytetrafluoroethylene, instead of rubber, there would be a much lower coefficient of friction and the frictional forces between the friction disk 102, the ratchet disk 104 and the base disk 100 would be materially decreased. Similarly, if the diameter of the friction disk 102 was increased, the frictional forces between the disk 102 and the ratchet disk 104 would be increased.

It will also be apparent that the greater the frictional forces in the friction means 50, the greater the load which the lifting device 12 is capable of retaining in a fixed position. Thus, if the load capacity of the lifting device 12 is exceeded, the frictional forces present in the friction means 50 will be overcome by the downward force exerted on the outer housing 36 and the screw 42 will be rotated clockwise to gradually lower the load. It should be noted, however, that even when the loading capacity of the lifting device 12 is exceeded there will, in all probability, be no permanent damage to the components of the lifting device. It will also be apparent to those skilled in the art that the thrust bearing 122 could, in a low capacity system, be eliminated. In addition, the base disk 100 could, if desired, be fixedly connected to the shoulder 48 of the screw 42. Since these and other modifications will, no doubt, occur to those skilled in the art; it is contemplated to cover by the appended claims any such modification as fall within the true spirit and scope of the invention.

What is claimed is:

1. An assembly for mounting on the tongue of a trailer comprising: an outer housing means including an upper end wall having upper and lower surfaces; mounting means secured to said outer housing means to attach the assembly to the tongue of the trailer; a screw means rotatably fastened to said endwall of said outer housing means and having an upper end portion projecting above said upper surface of said end wall; an element fixed on said upper end portion and bearing on said upper surface of said end wall supporting said screw means; said element being engageable by a drive member such as a handle for actuating said screw means; a nut means mounted in mating engagement with said screw means; an inner housing means secured to said nut means in a telescopic relationship with said outer housing means; friction means rotatably mounted on said screw means to retard relative movement between said screw means and said outer housing means, in one direction and permitting free rotation of the screw means in the opposite direction, and an anti-friction thrust bearing between said friction means and said lower surface of said outer housing means end wall, said friction means including a friction disk supported by shoulder means on said screw means, said friction means including a ratchet disk means between said friction disk and said bearing, a flexure spring pawl element fixed to said outer housing means and engaging said ratchet disk and restraining said disk for unidirectional rotation relative to said outer housing means, said friction disk retarding relative rotation between said screw means and said ratchet disk means, wherein the telescopic relationship between said inner housing and said outer housing is increased by rotating said screw means relative to said ratchet disk.

2. An assembly as set forth in claim 1 wherein: said nut means includes a recirculating ball type nut unit which is secured against rotation relative to said outer housing means.

3. An assembly as set forth in claim 1 further including: wheel means secured to said inner housing means to facilitate movement of the trailer tongue.

4. An assembly as set forth in claim 1 further including: detent means extending inwardly from said outer housing to limit relative movement between said inner and outer housings.

References Cited

UNITED STATES PATENTS

| 2,638,315 | 5/1953 | Wagner | 254—86 |
| 2,674,438 | 4/1954 | Dalton | 254—86 |
| 3,010,699 | 11/1961 | McKay | 254—86 |
| 3,033,522 | 5/1962 | McKay | 254—86 |

OTHELL M. SIMPSON, *Examiner.*